United States Patent
Angle et al.

(10) Patent No.: US 11,240,186 B2
(45) Date of Patent: Feb. 1, 2022

(54) IDENTIFICATION OF CONVERGED CONVERSATION THREADS

(71) Applicant: MICROSOFT TECHNOLOGY LICENSING, LLC, Redmond, WA (US)

(72) Inventors: Sachi Vinayak Angle, Bangalore (IN); K. S. Harini, Bangalore (IN); Shivam Gupta, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 16/420,081

(22) Filed: May 22, 2019

(65) Prior Publication Data

US 2020/0374252 A1    Nov. 26, 2020

(51) Int. Cl.
*H04L 12/58* (2006.01)
*G06F 3/0482* (2013.01)
*G06F 16/903* (2019.01)
*G06N 20/00* (2019.01)

(52) U.S. Cl.
CPC ............ *H04L 51/16* (2013.01); *G06F 3/0482* (2013.01); *G06F 16/903* (2019.01); *G06N 20/00* (2019.01)

(58) Field of Classification Search
CPC ......... H04L 51/16; H04L 51/36; H04L 51/02; H04L 51/32; H04L 51/26; G06F 16/903; G06F 3/0482; G06F 16/90335; G06F 16/951; G06N 20/00; H04W 4/12; G06Q 50/01
USPC ...................................................... 709/206
See application file for complete search history.

(56) References Cited

U.S. PATENT DOCUMENTS

| | | | |
|---|---|---|---|
| 8,560,567 B2 | 10/2013 | Carpio et al. | |
| 2009/0193430 A1 | 7/2009 | Chao | |
| 2009/0210504 A1* | 8/2009 | Shuster | H04L 51/04 709/206 |
| 2013/0246534 A1* | 9/2013 | Chebiyyam | H04L 51/16 709/206 |
| 2014/0052716 A1 | 2/2014 | Chakra et al. | |
| 2015/0256675 A1 | 9/2015 | Sri et al. | |
| 2016/0062988 A1 | 3/2016 | Allen et al. | |
| 2017/0249368 A1* | 8/2017 | Petrucci, III | G06Q 10/063112 |
| 2017/0270951 A1 | 9/2017 | Ekambaram et al. | |
| 2017/0289093 A1 | 10/2017 | Snider et al. | |
| 2018/0165582 A1 | 6/2018 | Cha | |

(Continued)

OTHER PUBLICATIONS

Shrestha, et al. "Detection of Question-Answer Pairs in Email Conversations", In Proceedings of the 20th International Conference on Computational Linguistics, Aug. 23, 2004, 7 Pages.

*Primary Examiner* — Chris Parry
*Assistant Examiner* — Weiwei Y Stiltner
(74) *Attorney, Agent, or Firm* — Newport IP, LLC; Han Gim

(57) ABSTRACT

Technologies are disclosed for identifying converged conversation threads. A number of the most recent messages in a conversation thread are selected. Selected messages that are action messages or query messages are identified. Scores are then assigned to the action and query messages. A determination is then made as to whether the conversation thread is converged or non-converged based upon the scores. Data is then stored that indicates that the conversation thread is converged or non-converged. The stored data can be used to locate converged or non-converged threads and identify the threads in a UI as such.

20 Claims, 15 Drawing Sheets

(56) References Cited

U.S. PATENT DOCUMENTS

| | | | |
|---|---|---|---|
| 2019/0140993 A1* | 5/2019 | Deets, Jr. | G06F 40/35 |
| 2019/0386949 A1* | 12/2019 | Vennam | G06Q 10/109 |
| 2020/0089767 A1* | 3/2020 | Ni | G10L 15/265 |
| 2020/0374258 A1* | 11/2020 | Fox | H04L 51/32 |

* cited by examiner

| MSG # | MESSAGE | ML RESULT | WEIGHTED SCORE |
|---|---|---|---|
| 1 | USER: HI, CAN YOU PLEASE CHECK TO SEE WHY MY JOB IS FAILING? | NOT CONSIDERED | N/A |
| 2 | ADMIN: CAN YOU PLEASE PROVIDE US WITH THE JOB ID? | ACTION MESSAGE | Z |
| 3 | USER: SURE, THE JOB ID IS 44. | NON-QUERY OR ACTION MESSAGE | 0 |
| 4 | ADMIN: THE SERVER WAS DOWN. WE HAVE RESTARTED YOUR JOB. | NON-QUERY OR ACTION MESSAGE | 0 |
| 5 | ADMIN: YOUR JOB IS RUNNING. IS THERE ANYTHING ELSE I CAN HELP YOU WITH? | QUERY MESSAGE | Z+8 |

THREAD START ——TIME——► THREAD END $Y = 4$ $X = 5$, WHICH IS $> Y$. THEREFORE, PASS LAST $Y$ (4) MESSAGES TO ML MODELS.

AVERAGE OF SCORES = $(Z + 0 + 0 + Z + 8 ) / 4 = (2Z + 8) / 4$ $(2Z + 8) / 4 < Z$

THREAD IS CONVERGED

IF AVERAGE OF WEIGHTED SCORES $< Z$, THEN THREAD CONVERGED

IF AVERAGE OF WEIGHTED SCORES $>= Z$, THEN THREAD NOT CONVERGED

FIG. 6A

| MSG # | MESSAGE | ML RESULT | WEIGHTED SCORE |
|---|---|---|---|
| 1 | USER: HI, CAN YOU PLEASE CHECK TO SEE WHY MY JOB IS FAILING? | NOT CONSIDERED | N/A |
| 2 | ADMIN: CAN YOU PLEASE PROVIDE US WITH THE JOB ID? | ACTION MESSAGE | Z |
| 3 | USER: SURE, THE JOB ID IS 44. | NON-QUERY OR ACTION MESSAGE | 0 |
| 4 | ADMIN: THE SERVER WAS DOWN. WE HAVE RESTARTED YOUR JOB. | NON-QUERY OR ACTION MESSAGE | 0 |
| 5 | USER: THANKS VERY MUCH! | NON-QUERY OR ACTION MESSAGE | 0 |

THREAD START ——————TIME——————▶ THREAD END

Y = 4

X = 5, WHICH IS > Y. THEREFORE, PASS LAST Y (4) MESSAGES TO ML MODELS.

AVERAGE OF SCORES = Z/4

Z/4 < Z

THREAD IS CONVERGED

IF AVERAGE OF WEIGHTED SCORES < Z, THEN THREAD CONVERGED

IF AVERAGE OF WEIGHTED SCORES >= Z, THEN THREAD NOT CONVERGED

FIG. 6B

| MSG # | MESSAGE | ML RESULT | WEIGHTED SCORE |
|---|---|---|---|
| 1 | USER: HI, CAN YOU PLEASE CHECK TO SEE WHY MY JOB IS FAILING? | NOT CONSIDERED | N/A |
| 2 | ADMIN: OF COURSE. | NOT CONSIDERED | N/A |
| 3 | USER: THE JOB ID = 6. | NON-QUERY OR ACTION MESSAGE | 0 |
| 4 | ADMIN: WHAT IS YOUR USERNAME? | QUERY MESSAGE | Z+2 |
| 5 | USER: JSMITH. | NON-QUERY OR ACTION MESSAGE | 0 |
| 6 | ADMIN: WE HAVE RESTARTED YOUR JOB. | NON-QUERY OR ACTION MESSAGE | 0 |

THREAD START → TIME → THREAD END $Y = 4$
$X = 6$, WHICH IS $> Y$.
THEREFORE, PASS LAST Y (4) MESSAGES TO ML MODELS.

AVERAGE OF SCORES $= (Z+2) / 4$ $(Z+2)/4 < Z$

THREAD IS CONVERGED

IF AVERAGE OF WEIGHTED SCORES $< Z$, THEN THREAD CONVERGED

IF AVERAGE OF WEIGHTED SCORES $>= Z$, THEN THREAD NOT CONVERGED

FIG. 6C

IDENTIFICATION OF CONVERGED CONVERSATION THREADS

BACKGROUND

Many types of messaging systems organize messages according to conversation threads. A conversation thread is a collection of related electronic messages such as, for instance, the email messages in an ongoing exchange between two or more users, the chat messages in a group message exchange, a sequence of text messages between two or more users, or a collection of messages relating to a particular topic on a web forum.

In many environments, users can be inundated with large numbers of conversation threads. For example, a user in an office environment might receive hundreds of email messages a day in various conversation threads. As a result, the user might have to search and navigate a large number of conversation threads in order to find a thread of interest. Manual search and navigation of a large number of conversation threads in this manner can be very time consuming and can utilize significant computing resources, such as processor cycles, memory, network bandwidth, and power.

It is with respect to these and other technical challenges that the disclosure made herein is presented.

SUMMARY

Technologies are disclosed herein for identifying converged conversation threads. Through implementations of the disclosed technologies, conversation threads (which might also be referred to herein as "topic threads" or simply "threads") can be efficiently identified as being converged or non-converged. Converged and/or non-converged conversation threads can then be identified in a user interface ("UI"), thereby enabling users to easily identify threads of interest. As a result, computing resources such as those described above can be conserved. Other technical benefits not specifically mentioned herein can also be realized through implementations of the disclosed subject matter.

In order to realize the technical benefits mentioned briefly above, and potentially others, a computing system is provided that can process conversation threads and determine whether the conversation threads are converged or non-converged. Examples of converged conversation threads include, but are not limited to, conversation threads that include a message indicating that a requested action has been performed and conversation threads that provide an answer to a query, or queries, posted in the conversation thread. Examples of non-converged conversation threads include, but are not limited to, threads indicating that an action requested previously in the thread has not been performed or that do not provide an answer to query posed previously in the thread.

In order to classify a conversation thread as converged or non-converged, the disclosed computing system first selects a number of the most recent messages in a conversation thread. For example, the system might select four (or another number) most recent messages in the conversation thread. In some embodiments, the number of messages selected is based upon the total number of messages in the conversation thread. For example, a predetermined number of recent messages might be selected from the conversation thread if the total number of messages in the thread exceeds a threshold value. A different predetermined number of messages might be selected if the total number of messages in the conversation thread does not exceed the threshold value.

Once the disclosed computing system has selected messages from the conversation thread, the system identifies those messages among the selected messages that are action messages or query messages. As mentioned above, a query message includes a question, while an action message requests the performance of an action. In some embodiments, machine learning ("ML") models are trained and utilized to classify messages as being query messages or action messages.

Once the disclosed computing system has identified the selected messages that are query or action messages, the computing system assigns scores to these messages. In some embodiments, the scores are assigned based upon the position of each message in the conversation thread. For example, more recent messages in the conversation thread might be assigned higher scores than older messages in the thread.

The disclosed system can then determine if the conversation thread is converged or non-converged based on the computed scores. For instance, in one particular embodiment, the disclosed system computes an average of the scores. If the average of the scores exceeds a predetermined value, then the conversation thread is non-converged. If the average of the scores does not exceed the predetermined value, then the conversation thread is converged. The disclosed system can then store data indicating that the conversation thread is converged or non-converged.

The disclosed system can utilize the stored data to identify converged or non-converged threads and present the threads in a UI as appropriate. For example, converged threads relating to a user query might be identified in a UI. As another example, non-converged threads might be presented in a UI, thereby allowing a user to easily identify those threads that require attention.

As discussed briefly above, implementations of the technologies disclosed herein can reduce the utilization of computing resources when users attempt to locate a conversation thread, or threads, of interest. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
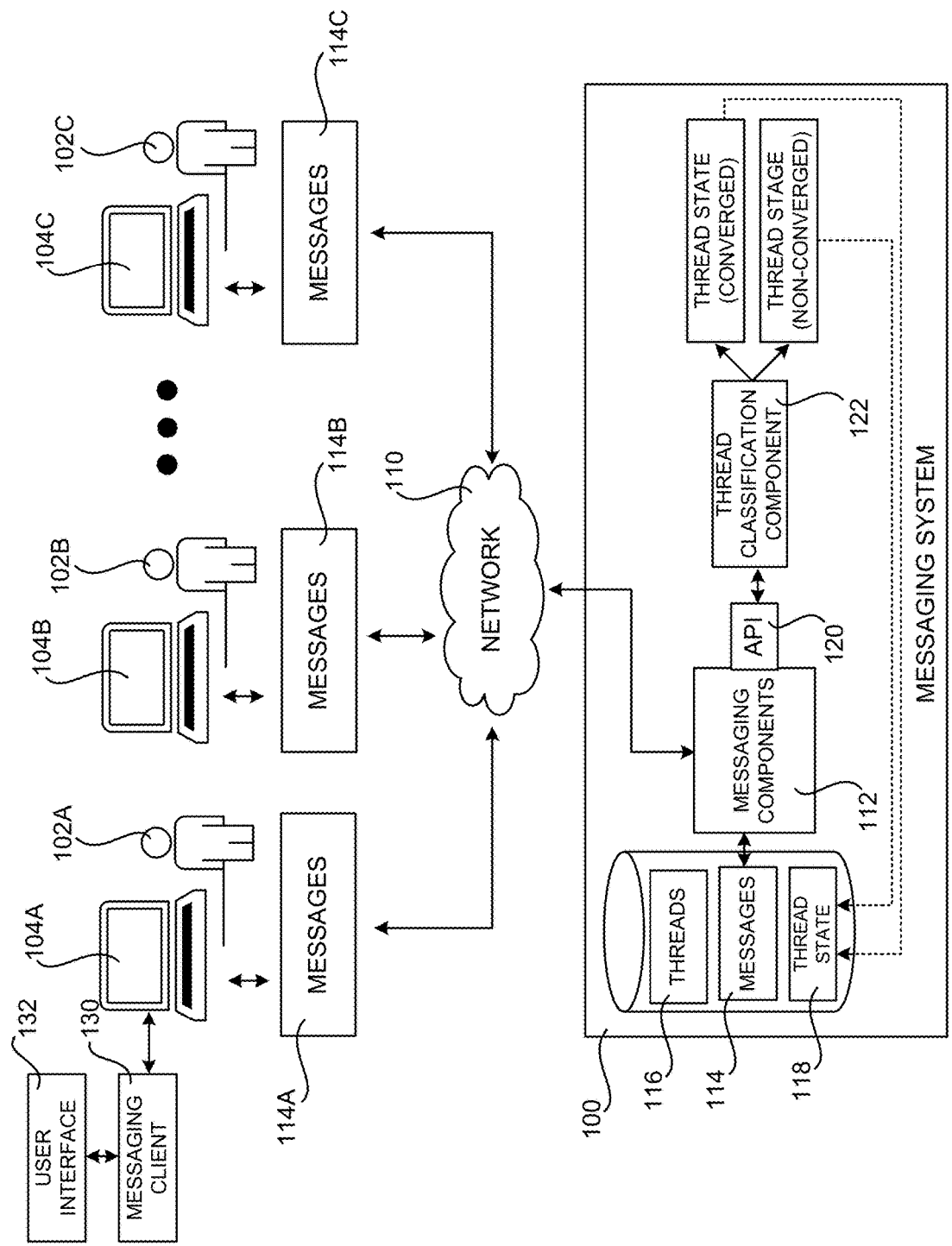
FIG. 1 is a computing architecture diagram that shows aspects of the configuration and operation of a messaging system, including a thread classification component, that implements the various technologies disclosed herein, according to one embodiment.

The following detailed description is directed to technologies for identifying converged conversation threads. As mentioned above, implementations of the technologies disclosed herein can reduce the utilization of computing resources when users attempt to locate a conversation thread, or threads, of interest. Other technical benefits not specifically identified herein can also be realized through implementations of the disclosed technologies.

While the subject matter described herein is presented in the general context of a messaging system configured to identify converged and non-converged conversation threads, those skilled in the art will recognize that other implementations can be performed in combination with other types of computing systems and modules. Those skilled in the art will also appreciate that the subject matter described herein can be practiced with various computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for identifying converged conversation threads will be described.

FIG. 1 is a computing architecture diagram that shows aspects of the configuration and operation of a messaging system 100 that implements the various technologies disclosed herein, according to one embodiment. In various examples, the messaging system 100 can be operated by an entity that provides electronic messaging services to users 102A-102C (which might be referred to herein individually as "a user 102" or collectively as "the users 102") of client computing devices 104A-104C (which might be referred to herein individually as "a client computing device 104" or collectively as "the client computing devices 104"), respectively.

The client computing devices 104 enable users 102 to participate in messaging conversations such that the users 102A-102C can post messages 114A-114C (which might be referred to herein individually as "a message 114" or collectively as "messages 114"), respectively, to a conversation and also view messages 114 posted by other users 102.

The messaging functionality disclosed herein can be provided by the messaging system 100 over one or more networks 110. That is, the messaging system 100 may provide a network service that enables users of the client computing devices 104 to participate in messaging conversations. As an alternative, messaging conversations may be hosted by one of the client computing devices 104 utilizing peer-to-peer technologies and, therefore, some or all of the functionality described herein can be implemented without the use of the messaging system 100.

The messaging system 100 can include various types of computing devices (not shown in FIG. 1) in order to provide the functionality disclosed herein. The devices and/or other components of the messaging system 100 can include, but are not limited to, distributed computing resources that communicate with one another and/or with remote devices such as the client computing devices 104, via the network 110.

Network 110 can include, for example, public networks such as the Internet, private networks such as an institutional and/or personal intranet, or some combination of private and public networks. Network 110 can also include any type of wired and/or wireless network, including but not limited to local area networks ("LANs"), wide area networks ("WANs"), satellite networks, cable networks, Wi-Fi networks, WiMAX networks, mobile communications networks (e.g., 3G, 4G, 5G, and so forth) or any combination thereof.

Network 110 can utilize communications protocols, including packet-based and/or datagram-based protocols such as Internet protocol ("IP"), transmission control protocol ("TCP"), user datagram protocol ("UDP"), or other types of protocols. Moreover, network 110 can also include a number of devices that facilitate network communications and/or form a hardware basis for the networks, such as switches, routers, gateways, access points, firewalls, base stations, repeaters, backbone devices, and the like.

In some examples, network 110 can further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, the messaging system 100 is implemented using computing devices such as, for example, one or more computing devices that operate in a cluster or other grouped configuration to share resources, balance load, increase performance, provide fail-over support or redundancy, or for other purposes. For instance, devices such as server computers, desktop computers, web-server computers, personal computers, mobile computers, laptop computers, tablet computers, or any other sort of computing device can be utilized.

The client computing devices 104 can be implemented as traditional client-type devices, desktop computer-type devices, mobile-type devices, special purpose-type devices, embedded-type devices, and/or wearable-type devices. Thus, a client computing device 104 can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a workstation, a media player, a personal video recorder ("PVR"), a set-top box, a camera, an integrated component (e.g., a peripheral device) for inclusion in a computing device, an appliance, or any other type of computing device.

In some implementations, a client computing device 104 includes input/output ("I/O") interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like). A computing device 104 can also include a combination of two or more devices, such as a mobile phone in combination with a wearable device.

Each of the computing devices 104 can also include one or more network interfaces to enable communications between a computing device 104 and the messaging system 100. Such network interfaces can include network interface controllers ("NICs") or other types of transceiver devices to send and receive communications and/or data over a network 110.

In the example environment shown in FIG. 1, the computing devices 104 execute a messaging client 130 to connect with one another and/or the messaging system 100 in order to participate in a messaging conversation. When executing the messaging client 130, the computing devices 104 can share and/or receive data of the messaging conversation, over the network 110.

As shown in FIG. 1, the messaging system 100 is configured with one or more messaging components 112. The messaging components 112 are software components that are configured to exchange (e.g., receive and/or transmit), as part of an individual messaging conversation being hosted, messages 114 with computing devices 104. To this end, the messages 114 of a messaging conversation can be shared with all or some of the participants of the messaging conversation. The messages 114 can include text and/or other types of information such, but not limited to an image, an attachment (e.g., a file), an indication of an interaction (e.g., a like of a previously posted message), etc. The messages 114 can be maintained in an appropriate data store, or stores.

The messaging components 112 of the messaging system 100 can organize the messages 114 as conversation threads 116 (which might also be referred to herein as "topic threads" or simply "threads"). As discussed briefly above, a conversation thread 116 is a collection of related messages 114 such as, for instance, the email messages in an ongoing exchange between two or more users 102, the chat messages in a group message exchange, a sequence of text messages between two or more users 102, or a collection of messages relating to a particular topic on a web forum.

Conversation threads 116 commonly begin with a message 114 making a query or requesting the performance of an action. For example, a message 114 in a conversation thread 116 that includes a query (which might be referred to herein as a "query message") might state: "What is the answer to this question?" Similarly, a message 114 in a conversation thread 116 that requests performance of an action (which might be referred to herein as an "action message") might state: "Please do this task for me."

Conversation threads 116 also typically include other messages 114 following a query message or an action message. For example, messages 114 in a thread 116 that follow a query message might provide an answer to the posed query. Messages 114 that follow an action message might indicate that the requested action has been performed. Other messages 114 in a thread 116 might pose additional queries, request the performance of additional actions, or include unrelated subject matter.

Conversation threads 116 that include query messages or action messages can be converged or non-converged. Examples of converged conversation threads include, but are not limited to, conversation threads that include a message indicating that a requested action has been performed and conversation threads that provide an answer to a query, or queries, posted in the conversation thread. Examples of non-converged conversation threads include, but are not limited to, threads indicating that an action requested previously in the thread has not been performed or that do not provide an answer to query posed previously in the thread.

In many scenarios, it can be difficult for users 102 to identify converged conversation threads 116 relating to a topic of interest. For example, a user 102 might initiate a query of messages 114 maintained by the messaging system 100 relating to a particular topic of interest. In response thereto, the messaging system 100 might identify many conversation threads 116 that include messages 114 having keywords relating to the topic, some of which might be converged and others of which might be non-converged. In this scenario, the user 102 must navigate through the converged and non-converged threads 116 in an attempt to locate a converged thread 116 that contains an answer to their query. This process can be very time consuming and can utilize significant computing resources, such as processor cycles, memory, network bandwidth, and power. The technologies disclosed herein address these and potentially other considerations.

In another scenario, a user 102 might need to identify only those conversation threads that require attention from a large number of threads. For instance, a manager might participate in many conversation threads with many other users regarding many different topics. In order to identify non-converged threads (e.g. threads that require the manager's attention) among all of the threads, the manager typically has to manually navigate the threads. Manual search and navigation of a large number of conversation threads in this manner can also be very time consuming and can utilize significant computing resources, such as processor cycles, memory, network bandwidth, and power.

In order to address the technical considerations described above, and potentially others, the messaging system 100 is configured with a thread classification component 122 in some embodiments. The thread classification component 122 is a software component configured to classify threads 116 as being converged or non-converged. In order to provide this functionality, the thread classification component 122 can utilize an application programming interface ("API") 102 or other mechanism to communicate with the messaging components 112. In particular, the thread classification component 122 can utilize the API 120 to retrieve threads 116. The thread classification component 122 can then perform the processing described below to determine if the threads 116 are converged or non-converged.

Once the thread classification component 122 has determined whether a thread 116 is converged or non-converged, the thread classification component can store data 118 (which might be referred to herein as "thread state data 118") indicating whether the thread 116 is converged or non-converged.

The messaging system 100 can then utilize the stored thread state data 118 to retrieve converged or non-converged threads 116 and present the threads 116 in a UI as appropriate. For example, converged threads 116 relating to a user query might be identify in a UI 132 provided by the messaging client 130. As another example, non-converged threads 116 might be presented in the UI 132, thereby allowing a user 102 to easily identify those threads 116 that require attention. Other types of UIs identifying converged and/or non-converged threads 116 can be provided by other computing devices and/or systems in other configurations. Additional details regarding the mechanism described briefly above for identifying threads 116 as converged or non-converged will be provided below with regard to FIGS. 2-9.

Figure 2:
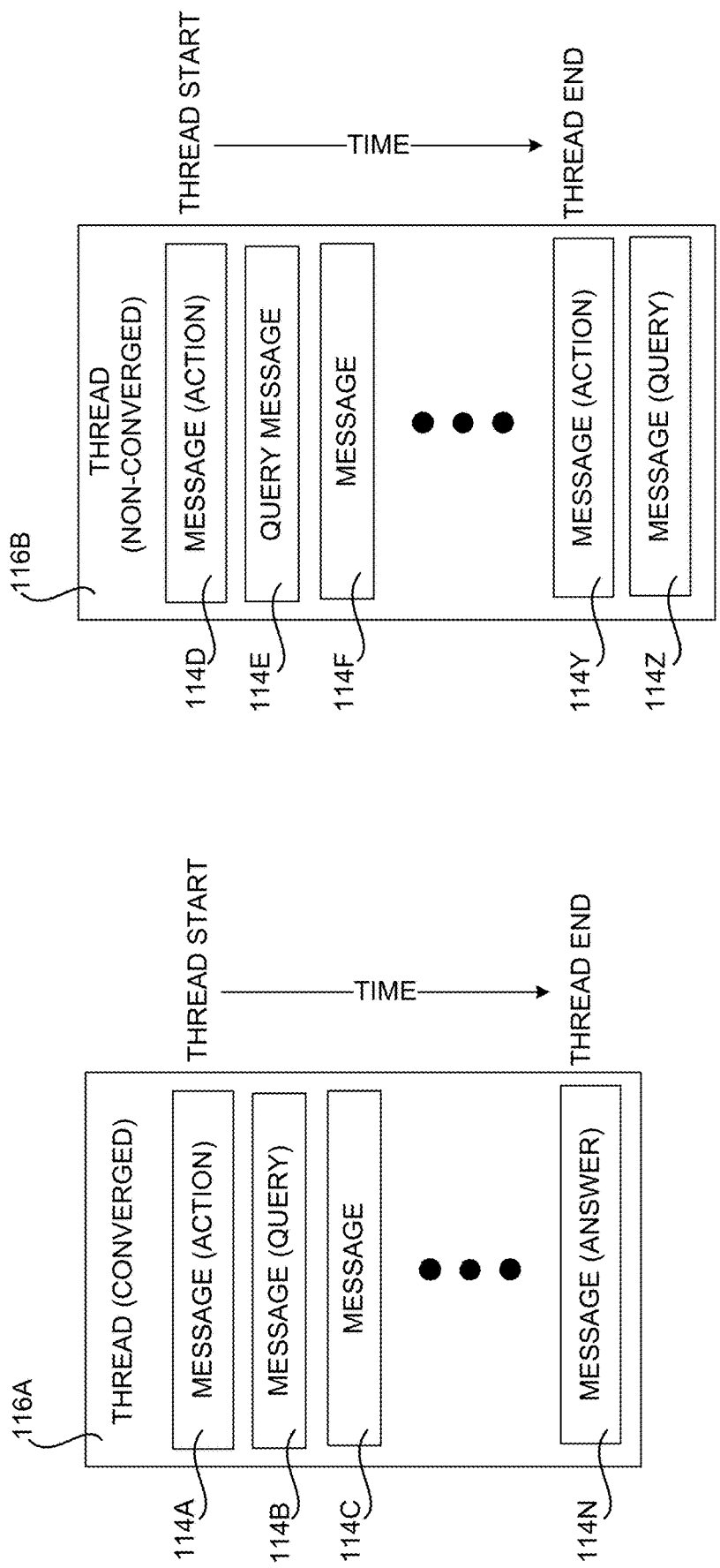
FIG. 2 is a conversation thread diagram showing aspects of a converged conversation thread and a non-converged conversation thread, according to one embodiment.

FIG. 2 is a conversation thread diagram showing aspects of a converged conversation thread 116A and a non-converged conversation thread 116B, according to one embodiment. As shown in FIG. 2 and described briefly above, conversation threads 116 commonly begin with an action message or a query message. In the example shown in FIG. 2, for instance, the thread 116A begins with a message 114A requesting performance of an action (i.e. an action message) or a message 114B that includes a query (i.e. a query message). Similarly, the thread 116B begins with a message 114D requesting performance of an action (i.e. an action message) or a message 114E that includes a query (i.e. a query message).

Once a thread 116 has started, additional messages 114 are added to the thread 116 over time (the arrows in FIG. 2 illustrate the creation of messages 114 with relation to the passage of time). The thread 116A, for instance, includes additional messages 114C-114N. The thread 116B includes messages 114F-114Z. Messages 114 in a thread 116 that follow a query message might provide an answer to the posed query. Messages 114 that follow an action message might indicate that the requested action has been performed. Other messages 114 in a thread 116 might pose additional queries, request the performance of additional actions, or include unrelated subject matter.

As discussed briefly above, the messages 114 in a conversation thread 116 might ultimately indicate that a requested action has been performed or provide an answer to a query, or queries, posted in the conversation thread 116. These types of conversation threads 116 are referred to herein as "converged threads." In the example shown in FIG. 2, for instance, the message 114N of the thread 116A provides an answer to the query posed by the message 115B. As a result, the thread 116A is a converged thread since the posed query has been addressed. If the thread 116A included a message 114A requesting performance of an action, the thread 116A would be converged if the message 114N indicated that the requested action had been performed.

In other cases, the messages 114 in a thread 116 do not indicate that a requested action has been performed or do not provide an answer to an originally-posed query. Such a conversation thread 116 might also include messages 114 posing additional queries or requesting the performance of additional actions. These types of conversations threads 116 are referred to herein as "non-converged threads." In the example shown in FIG. 2, for instance, there are no messages 114 addressing the posed query or action request. Rather, the thread 116B includes another action message 114M and another query message 114N. The thread 116B is, therefore, a non-converged thread.

Figure 3:
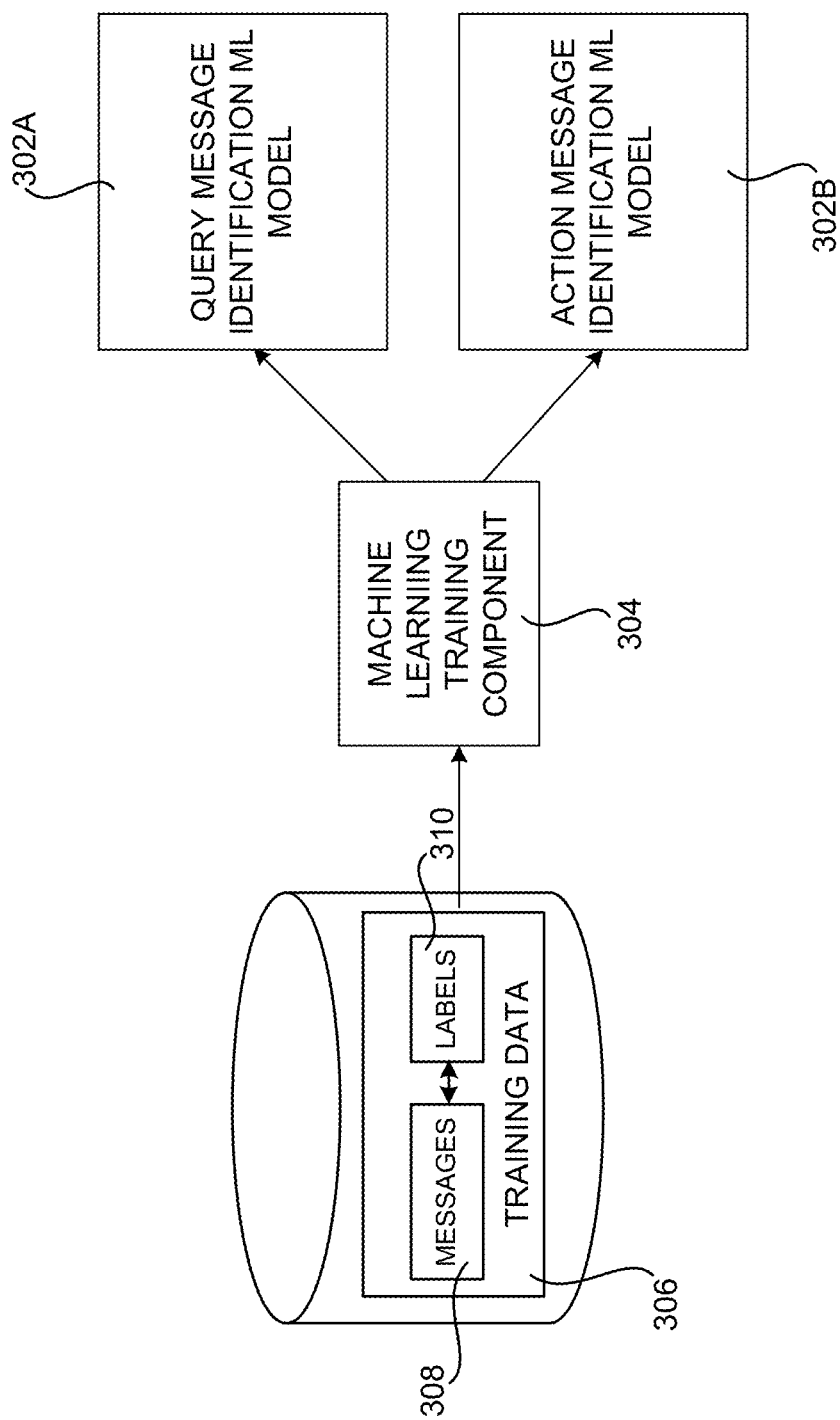
FIG. 3 is a computing architecture diagram that shows aspects of an illustrative mechanism for training machine learning models to identify messages containing queries or actions, according to one embodiment.

FIG. 3 is a computing architecture diagram that shows aspects of an illustrative mechanism for training one or more ML models to classify messages 114 as being query messages or action messages, according to one embodiment. As will be described in greater detail below, the thread classification component 122 classifies threads 116 as converged or non-converged by assigning scores to a portion of the messages 114 in the threads 116. In order to assign scores to the messages 114 in a thread 116, the thread classification component 122 first classifies the messages 114 as being action messages, request messages, or neither.

Several machine learning models are utilized to classify the messages 114 in the particular embodiment illustrated in FIG. 3. In particular, a query message identification ("ID") ML model 302A is trained that can classify messages 114 as containing a query (i.e. as query messages) or not containing a query. The action message ID ML model 302B can classify messages as requesting the performance of an action (i.e. as action messages) or not.

In one embodiment, a ML training component 304 is utilized to train the models 302A and 302B. In particular, the ML training component 304 can utilize training data 306 that includes messages 308 and associated labels 310 to train the models 302A and 302B. In the case of the query message ID ML model 302A, the messages 308 can have associated labels indicating whether the messages 308 are query messages. In the case of the action message ID ML model 302A, the messages 308 can have associated labels indicating whether the messages 308 are action messages.

Various ML techniques can be utilized to train the ML models 302A and 302B. For example, and without limitation, the ML models 302A and 302B can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In this regard, it is to be appreciated that while two ML models 302A and 302B are illustrated in FIG. 3, more or fewer ML models can be used in other configurations. Additional details regarding the use of the ML models 302A and 302B for identifying converged and non-converged conversation threads 116 will be provided below.

Figure 4A:
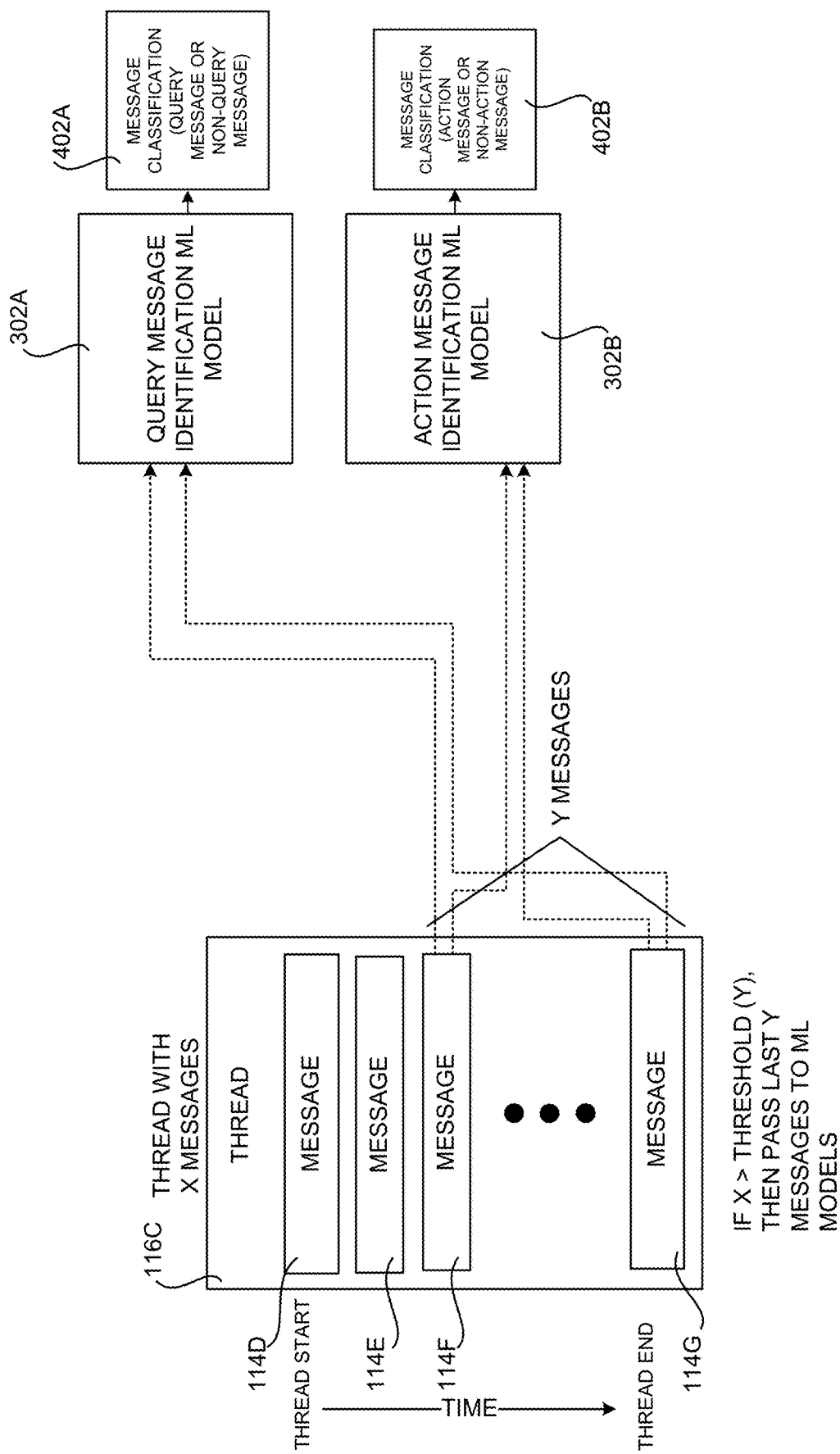
FIGS. 4A and 4B are software architecture diagrams that show aspects of an illustrative mechanism for selecting messages from a conversation thread for use in determining whether the conversation thread is converged or non-converged, according to one embodiment.
Figure 4B:
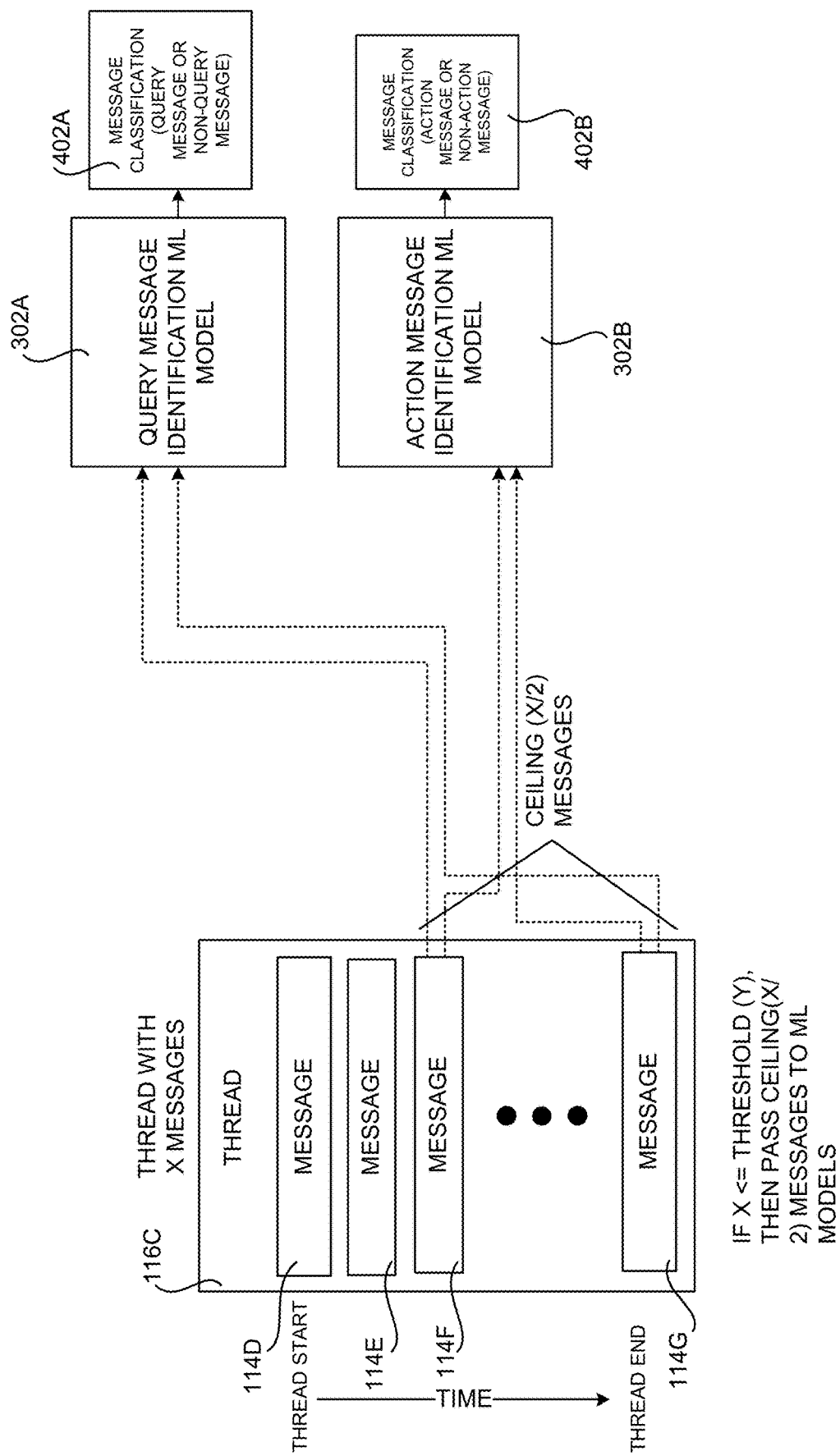

FIG. 4A is software architecture diagram that shows aspects of an illustrative mechanism for selecting messages 114 from a conversation thread 116 for use in determining whether the conversation thread 116 is converged or non-converged, according to one embodiment. As discussed briefly above, in order to classify a conversation thread 116 as converged or non-converged, the thread classification component 122 first selects a number of the most recent messages 114 in a conversation thread 116. For example, the thread classification component 122 might select the four (or another number) most recent messages 114 in a conversation thread 116.

In some configurations, the thread classification component 122 selects a number of the most recent messages 114 in a thread 116 based upon the total number of messages 114 in the conversation thread 116. For example, a predetermined number of recent messages 114 might be selected from the conversation thread 116 if the total number of messages 114 in the thread 116 exceeds a threshold value.

In the example illustrated in FIG. 4A, for instance, a conversation thread 116C is illustrated that includes a number (X) of messages 114D-114G. In this example, a threshold number (Y) of the most recent messages in the conversation thread 116 are selected if the total number of messages 114 in the conversation thread 116 exceeds the threshold (i.e. X>Y). For instance, if the thread 116C includes five messages and the threshold is set to four, the four most recent messages 114 in the thread 116 will be selected.

A different predetermined number of the most recent messages 114 in the thread 116C might be selected if the total number of messages 114 in the conversation thread 116C does not exceed the threshold value. For instance, in the example shown in FIG. 4B, a number of the most recent messages 114 equivalent to the ceiling of the total number of messages 114 in the thread 116 divided by two are selected. If the thread 116C includes three messages, for example, and the threshold is set to four, then the two most recent messages 114 will be selected (i.e. ceiling (3/2=2)). Other mechanisms can be utilized in other configurations to select a number of the most recent messages 114 in a conversation thread 116.

Once the thread classification component 122 has selected messages 114 from the conversation thread 116 in the manner described above, the thread classification component 122 identifies those messages among the selected messages that are action messages or query messages. As mentioned above, a query message 114 includes a question, while an action message 114 requests the performance of an action.

In order to determine if the selected messages 114 are action or query messages, the thread classification component 122 passes the selected messages 114 to the query message ID ML model 302A and the action message ID model 302B. The query message ID ML model 302A generates a message classification 402A for each of the selected messages 114 indicating whether the messages are query messages or non-query messages. Similarly, the action message ID ML model 302B generates a message classification 402B for each of the selected messages 114 indicating whether the messages are action messages or non-action messages. As will be described in greater detail below, the thread classification component 122 utilizes the classifications 402A and 402B to assign scores to the messages 114 selected from the conversation thread 116.

Figure 5:
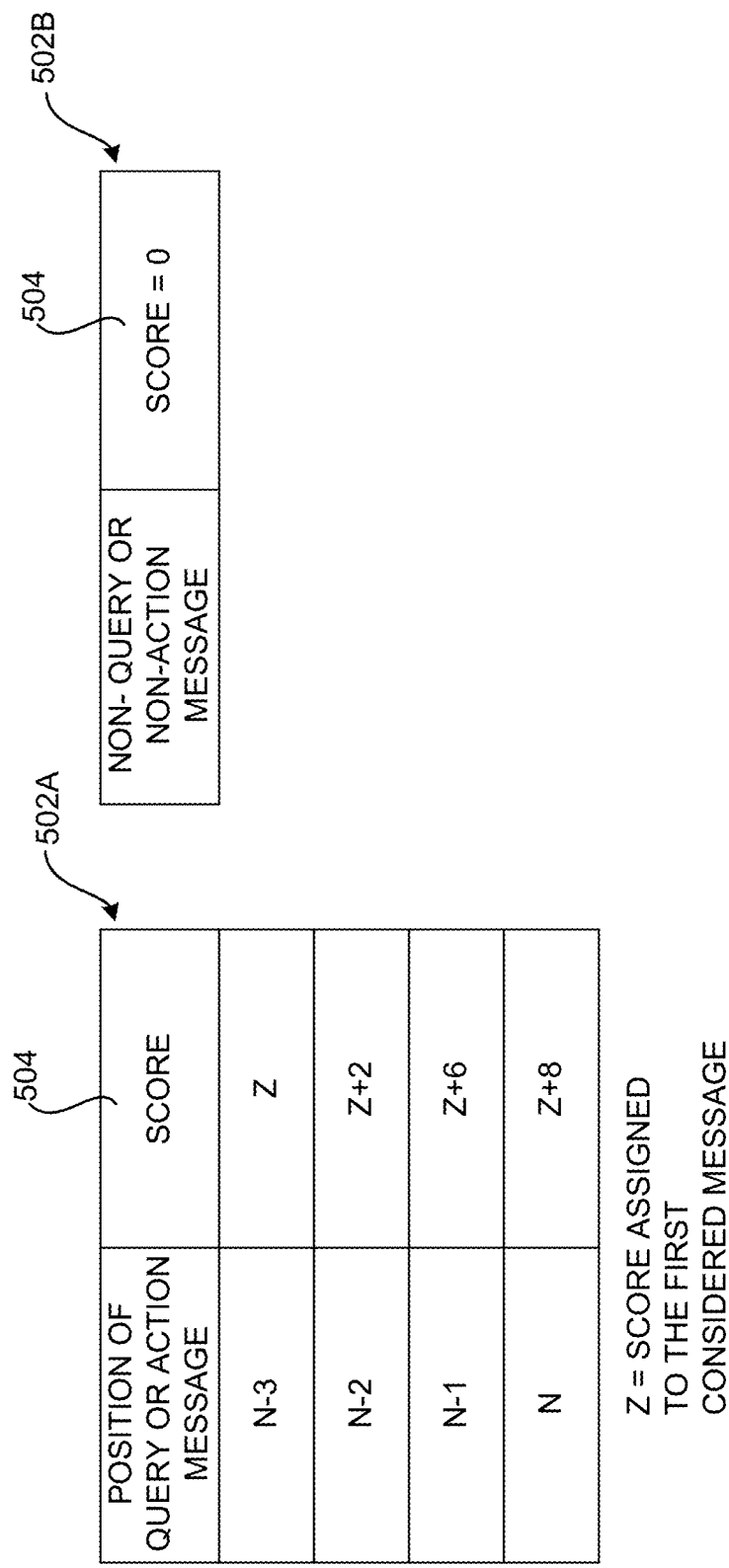
FIG. 5 is a data structure diagram showing one illustrative configuration for scores assigned to messages in a conversation thread that are utilized to determine whether the conversation thread is converged or non-converged, according to one embodiment.
Figure 6:
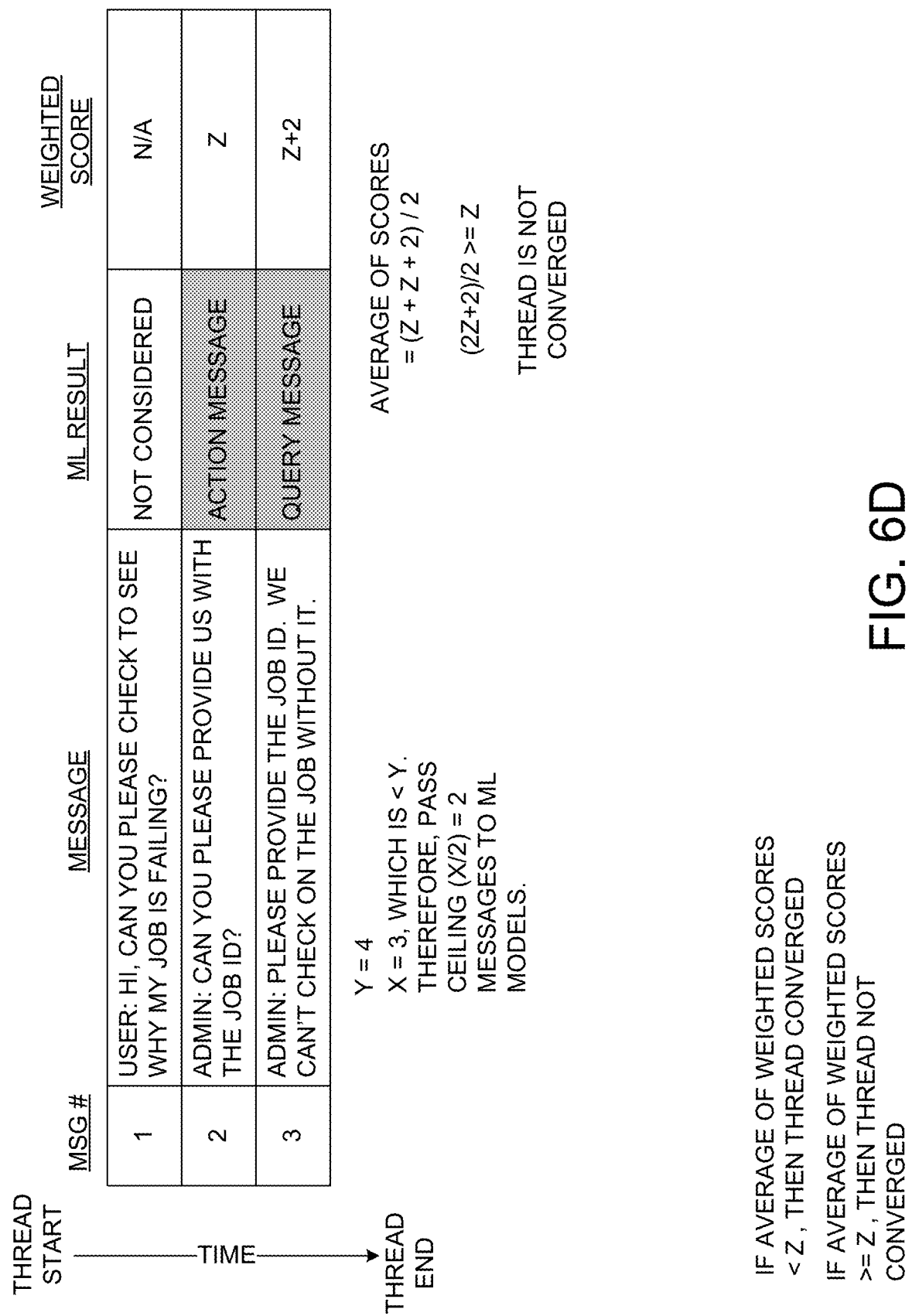
FIGS. 6A-6D illustrate aspects of the scoring of several example conversation threads for use in determining whether the conversation threads are converged or non-converged, according to one embodiment.

FIG. 5 is a data structure diagram showing one illustrative configuration for scores 504 that are assigned to messages 114 in a conversation thread 116, which are utilized to determine whether the conversation thread 116 is converged or non-converged, according to one embodiment. As discussed briefly above, once the thread classification component 122 has categorized the selected messages 114 from the conversation thread 116 as being query messages, action messages, or neither, the thread classification component 122 assigns scores 504 to the messages 114. Generally, action messages and query messages are assigned non-zero scores 504 and non-query messages and non-action messages are assigned a score 504 of zero (illustrated in the table 502B).

In some embodiments, scores 504 are assigned to action and query messages based upon the position of each message 114 within the conversation thread 116. For example, and without limitation, more recent messages 114 in the conversation thread 116 might be assigned higher scores than older messages 114 in the thread 116.

In the example shown in table 502A, for instance, the four most recent messages 114 have been selected from a conversation thread 116. Scores 504 have been assigned to the four messages 114 based upon their position in the conversation thread 116. The oldest of the selected messages 114 is assigned a score of Z (which can be any positive integer), the next most recent message 114 is assigned a score of Z+2, the next most recent message 114 is assigned a score of Z+6, and the most recent message 114 (i.e. the last message 114 in the thread 116) has been assigned a score of Z+8. Scores 504 can be assigned to selected recent messages 114 in a conversation thread 116 in other ways in other configurations.

FIGS. 6A-6D are scoring diagrams illustrating aspects of the scoring of several example conversation threads 116 for use in determining whether the conversation threads 116 are converged or non-converged, according to one embodiment. As discussed briefly above, the thread classification component 122 can classify a conversation thread 116 as being converged or non-converged based on the computed scores 504.

In one particular embodiment, for instance, the thread classification component 122 computes an average of the scores 504 for the messages 114 selected from a thread 116. If the average of the scores 504 exceeds a predetermined value, then the conversation thread 116 is non-converged. If the average of the scores 504 does not exceed the predetermined value, then the conversation thread 116 is converged. FIGS. 6A-6D provide several specific examples of this process.

In the example shown in FIG. 6A, a conversation thread 116 is shown that includes five messages 114. Using the mechanism described above with regard to FIGS. 4A and 4B, the four most recent messages 114 have been selected from the thread 116. In this case, four messages 114 are selected because the total number of messages in the illustrated conversation thread is greater than the threshold Y (which is four in this example) and, as a result, Y messages are selected.

The selected messages 114 have also been classified by the ML models 302A and 302B as being action messages, query messages, or neither. In particular, the second message has been classified as an action message, the third and fourth messages have been classified as non-query or action messages, and the most recent message has been classified as a query message.

Scores 504 have been assigned to the four most recent messages in the example shown in FIG. 6A in the manner described above. In particular, a score of Z has been assigned to the first selected message, scores 504 of zero have been assigned to the second and third messages, and a score 504 of Z+8 has been assigned to the most recent message. The assigned scores 504 are then averaged, providing a total score for the illustrated conversation thread 116 of (Z+0+0+Z+8)/4 or (2Z+8)/4. Because this value is less than Z, the illustrated conversation thread 116 is considered to be converged.

In the example shown in FIG. 6B, another conversation thread 116 is shown that includes five messages 114. Using the mechanism described above with regard to FIGS. 4A and 4B, the four most recent messages 114 have been selected from the thread 116. As in the example shown in FIG. 6A, four messages 114 are selected because the total number of messages in the illustrated conversation thread is greater than the threshold Y (which is four in this example) and, as a result, Y messages are selected.

The selected messages 114 have also been classified by the ML models 302A and 302B as being action messages, query messages, or neither. In particular, the second message has been classified as an action message, and the third, fourth, and fifth messages 114 have been classified as non-query or action messages.

Scores 504 have been assigned to the four most recent messages in the example shown in FIG. 6B also in the manner described above. In particular, a score of Z has been assigned to the second selected message, and scores 504 of zero have been assigned to the second, third, and fourth messages. The assigned scores 504 are then averaged, providing a final score for the illustrated conversation thread 116 of Z/4. Because this value is less than Z, the conversation thread 116 illustrated in FIG. 6B is also considered to be converged.

In the example shown in FIG. 6C, a conversation thread 116 is shown that includes six messages 114. Using the mechanism described above with regard to FIGS. 4A and 4B, the four most recent messages 114 have been selected from the thread 116. As in the examples described above, four messages 114 are selected because the total number of messages in the illustrated conversation thread (i.e. six) is greater than the threshold Y (which is four in this example) and, as a result, Y messages are selected.

The selected messages 114 in the example shown in FIG. 6C have also been classified by the ML models 302A and 302B as being action messages, query messages, or neither. In particular, the second message has been classified as an action message, the third, fifth and sixth messages 114 have been classified as non-query or action messages, and the fourth message 114 has been classified as a query message.

Scores 504 have been assigned to the four most recent messages in the example shown in FIG. 6C in the manner described above. In particular, a score of Z+2 has been assigned to the third selected message, and scores 504 of zero have been assigned to the other messages. The assigned scores 504 are then averaged, providing a final score for the illustrated conversation thread 116 of ((Z+2)/4. Because this value is less than Z, the conversation thread 116 shown in FIG. 6C is also considered to be converged.

In the example shown in FIG. 6D, a conversation thread 116 is shown that includes three messages 114. Using the mechanism described above with regard to FIGS. 4A and 4B, the two most recent messages 114 have been selected from the thread 116. Two messages 114 have been selected because the total number of messages in the illustrated conversation thread (i.e. three) is lower than the threshold Y (which is four in this example) and, as a result, ceiling (X/2) messages are selected. In this case, X=3 (i.e. three total message in the thread), so ceiling (3/2)=2.

The two selected messages 114 have also been classified by the ML models 302A and 302B as being action messages, query messages, or neither. In particular, the second message has been classified as an action message and the third message (i.e. the most recent message 114) has been classified as a query message.

Scores 504 have been assigned to the two most recent messages in the example shown in FIG. 6D in the manner described above. In particular, a score of Z has been assigned to the first selected message and a score 504 of Z+2 has been assigned to the most recent message. The assigned scores 504 are then averaged, providing a final score for the illustrated conversation thread 116 of (Z+Z+2)/2=(2Z+2)/2. Because this value is greater than Z, the illustrated conversation thread 116 is considered to be non-converged.

As discussed above, once a thread 116 has been classified as converged or non-converged, the thread classification component 122 can then store data 118 indicating that the conversation thread 116 is converged or non-converged. Additionally, the messaging system 100 can utilize the stored data 118 to identify converged or non-converged threads and present the threads in a UI 132 as appropriate. For example, converged threads 116 relating to a user query might be identified in the UI 132. As another example, non-converged threads 116 might be presented in the UI 132, thereby allowing a user to easily identify those threads that require attention.

Figure 7:
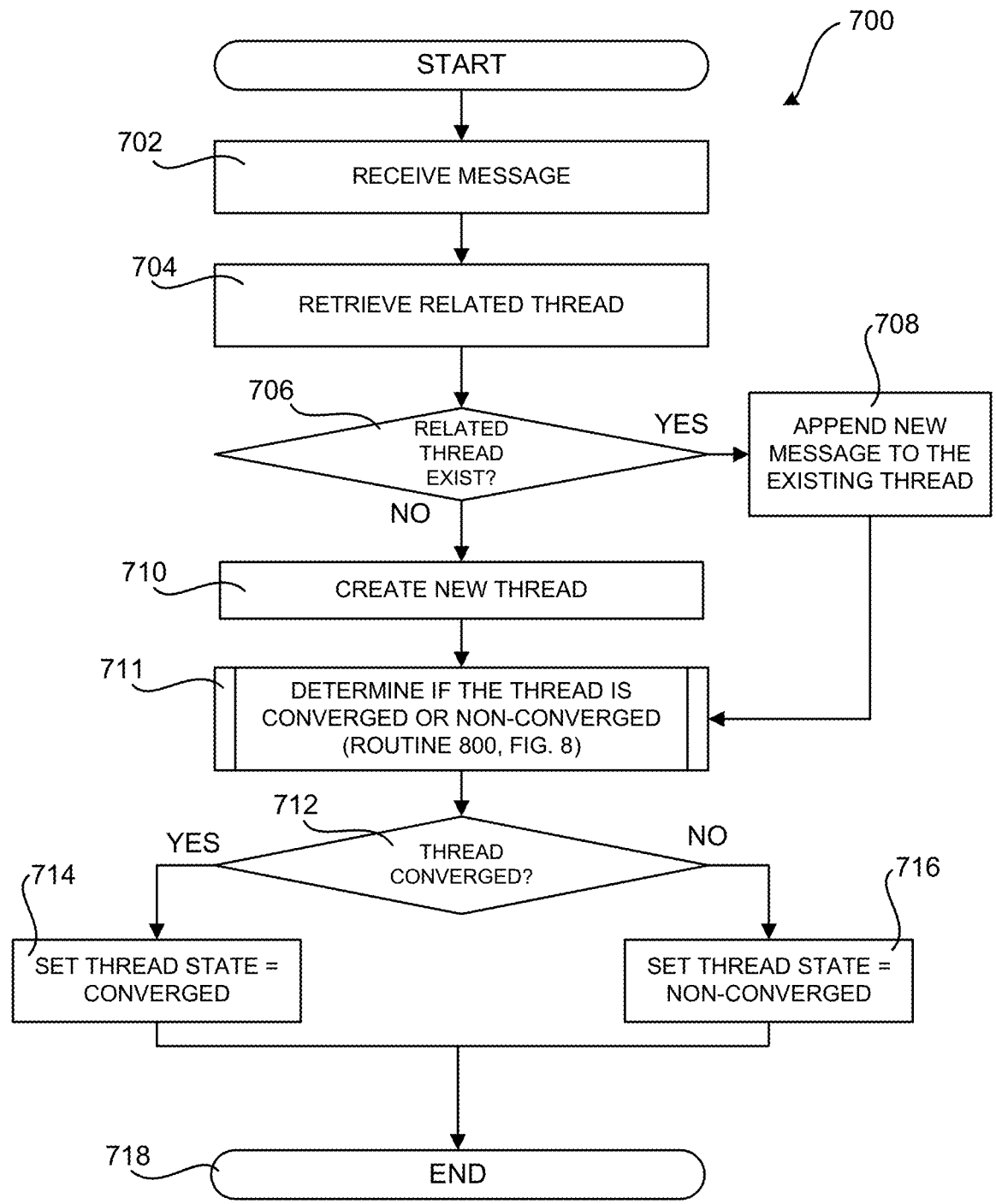
FIG. 7 is a flow diagram showing a routine that illustrates aspects of the operation of the thread classification component described with reference to FIGS. 1-6D for determining if a conversation thread is converged or non-converged, according to one embodiment.

FIG. 7 is a flow diagram showing a routine 700 that illustrates aspects of the operation of the thread classification component 122 described above with reference to FIGS. 1-6D for determining if a conversation thread 116 is converged or non-converged, according to one embodiment. It should be appreciated that the logical operations described herein with regard to FIG. 7, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 700 begins at operation 702, where the messaging system 100 receives a new message 114. For example, a user 102 might utilize the messaging client 130 to create a new message 114. The routine 700 then proceeds from operation 702 to operation 704, where the messaging system 100 attempts to retrieve a previously-created conversation thread 116 that is related to the new message 114. For instance, the new message 114 might be a reply to a message 114 previously posted to another conversation thread 116.

If a related thread 116 exists, the routine 700 proceeds from operation 706, to operation 708, where the new message 114 is appended to the existing conversation thread 116. The routine 700 then proceeds from operation 708 to operation 711, described below. If no related thread 116 exists, the routine 700 proceeds from operation 706 to operation 710, where the messaging system 100 creates a new thread 116 for the new message 114. The routine 700 then proceeds from operation 710 to operation 711.

At operation 711, the thread classification component 122 determines if the thread 116 to which the new message 114 was appended at operation 708 or created at operation 710 is converged or non-converged. One illustrative routine for determining whether a thread 116 is converged or non-converged is described below with regard to FIG. 8.

From operation 712, the routine 700 proceeds to operation 712, where the messaging system 100 determines if the thread 116 is converged. If so, the routine 700 proceeds from operation 712 to operation 714, where data 118 is stored indicating that the thread 116 is converged. If the thread 116 is determined to be non-converged, the routine 700 proceeds from operation 712 to operation 716, where data 118 is stored indicating that the thread 116 is non-converged. The routine 700 then proceeds from operation 714 or 716 to operation 718, where it ends.

Figure 8:
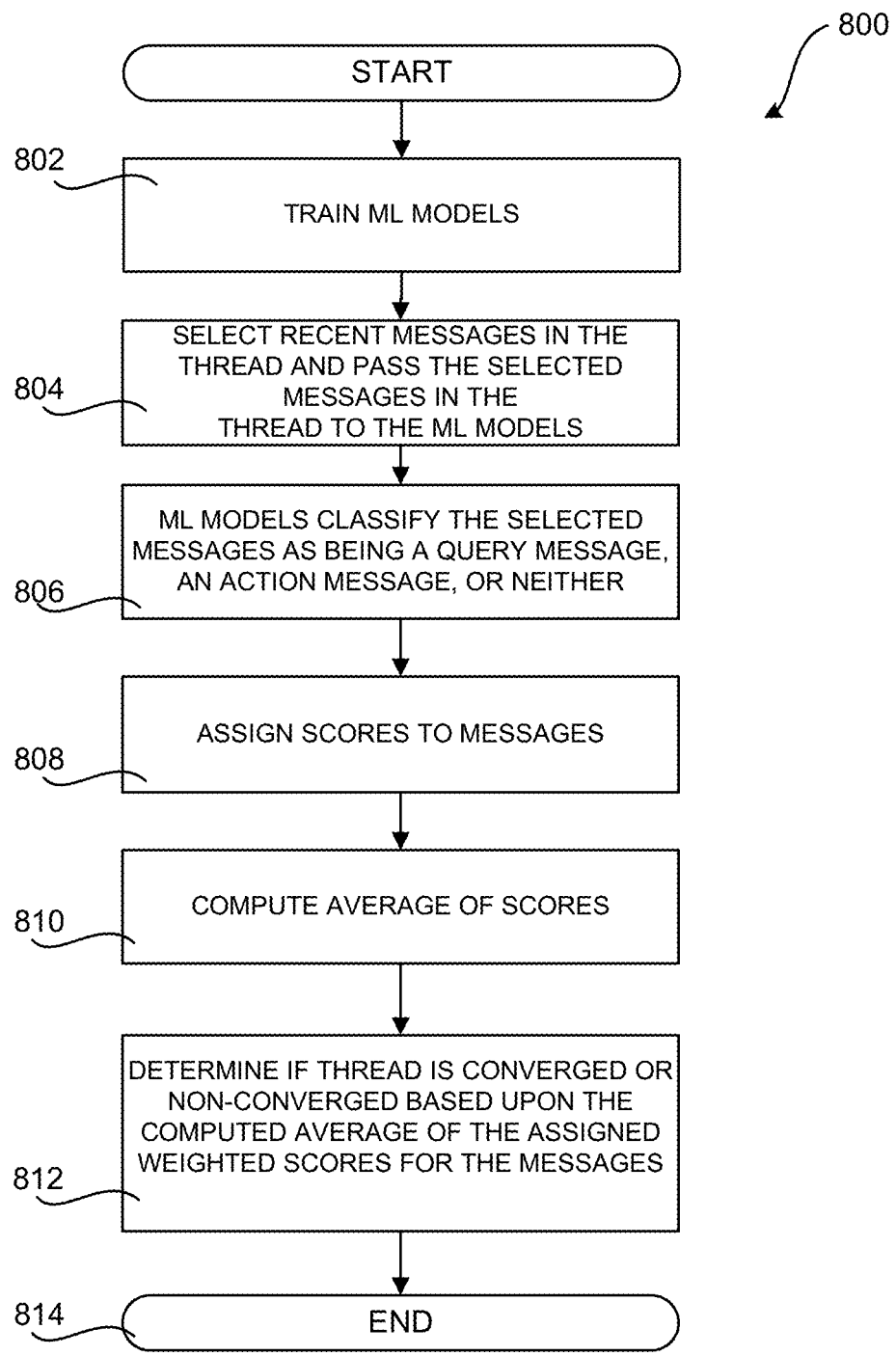
FIG. 8 is a flow diagram showing a routine that illustrates additional aspects of the operation of the process shown in FIG. 7 for determining if a conversation thread is converged or non-converged, according to one embodiment.

FIG. 8 is a flow diagram showing a routine 800 that illustrates additional aspects of the operation of the routine 700 shown in FIG. 7 for determining if a conversation thread 116 is converged or non-converged, according to one embodiment. The routine 800 begins at operation 802, where the ML models 302A and 302B are trained in the manner described above with regard to FIG. 3. The routine 800 then proceeds from operation 802 to operation 804.

At operation 803, the thread classification component 122 selects a number of recent messages 114 from the thread 116 in the manner described above with regard to FIGS. 4A and 4B. The thread classification component 122 then passes the selected messages to the ML models 302A and 302B.

From operation 804, the routine 800 proceeds to operation 806, where the ML models 302A and 302B classify the received messages 114 as being action messages, query messages, or neither. The routine 800 then proceeds from operation 806 to operation 808.

At operation 808, the thread classification component 122 assigns scores 504 to the messages 114 in the manner described above with regard to FIG. 5 and the example conversation threads 116 shown in FIGS. 6A-6D. The routine 800 then proceeds from operation 808 to operation 810, where the thread classification component 122 computes the average of the scores 504 assigned at operation 808.

From operation 810, the routine 800 proceeds to operation 812, where the thread classification component 122 determines if the thread 116 is converged or non-converged based upon the average of the scores 504 computed at operation 812. For instance, and as discussed above with regard to FIGS. 6A and 6B, in one embodiment a thread 116 is converged if the average of the scores 504 is less than the score 504 (Z in the examples above) assigned to the to the oldest selected message 114. A thread 116 is non-converged if the average of the scores 504 is greater than the score 504 (Z in the examples above) assigned to the oldest selected message 115. The routine 800 then proceeds from operation 812 to operation 814, where it ends.

Figure 9:
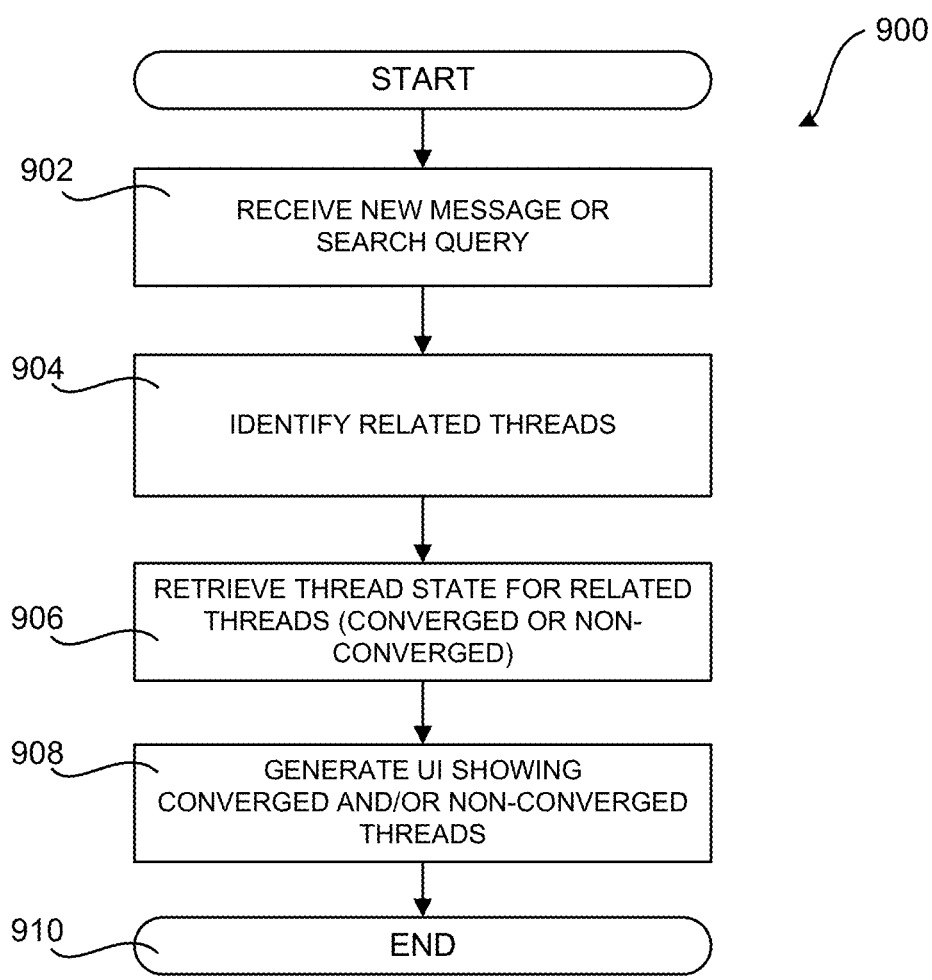
FIG. 9 is a flow diagram showing a routine that illustrates aspects of the operation of the system shown in FIG. 1 for presenting a user interface that identifies converged threads relating to a new message or a search query, according to one embodiment.

FIG. 9 is a flow diagram showing a routine 900 that illustrates aspects of the operation of the messaging system 100 shown in FIG. 1 for presenting a UI 132 that identifies converged and/or non-converged threads 116 relating to a new message or a search query, according to one embodiment. The routine 900 begins at operation 902, where the messaging system 100 receives a new message 114 or a search query in the illustrated example. In this regard, it is to be appreciate that the UI 132 might be generated in response to other types of events in other configurations.

From operation 902, the routine 900 proceeds to operation 904, where the messaging system 100 identifies threads 116 that are related to the new message 114 or query. For example, and without limitation, a keyword search might be performed to identify existing threads 116 that include subject matter relating to the new message or query. The routine 900 then proceeds from operation 904 to operation 906.

At operation 906, the messaging system 100 retrieves data 118 for the related threads 116 identified at operation 904 that indicates whether the threads 116 are converged or non-converged. The routine 900 then proceeds from operation 906 to operation 908, where the messaging system 100 generates a UI 132 for presentation at a client computing device 104 that identifies the related threads and indicates whether the threads 116 are converged or non-converged.

For example, in the case where a query is received at operation 902, the converged threads 116 might be presented in the UI 132 in order to assist a user 102 in identifying an answer to their query. Similarly, in the case where a new message 114 is received at operation 902, the converged threads 116 might be presented in the UI 132 in order to assist a user 102 in identifying related threads 116, particularly when the new message includes a query.

In other embodiments, it might be desirable to show non-converged threads 116 in the UI 132 such as, for example, in an email client application where a user 102 wants to identify email conversation threads 116 that require attention. The converged and non-converged threads 116 can be presented in the UI 132 as appropriate under other conditions in other embodiments. From operation 908, the routine 900 proceeds to operation 910, where it ends.

Figure 10:
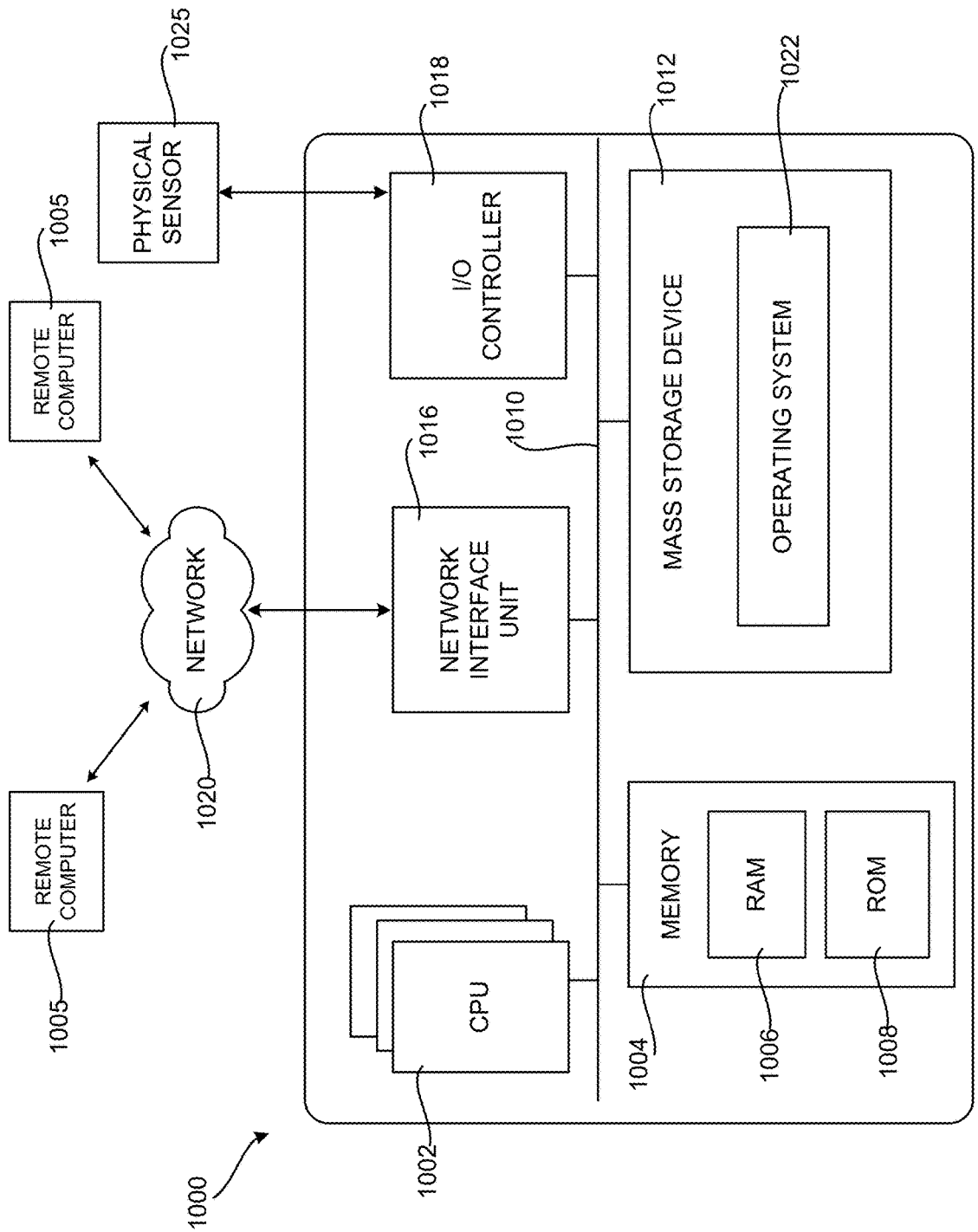
FIG. 10 is a computer architecture diagram showing an illustrative computer hardware and software architecture for a computing device that can implement aspects of the technologies presented herein.

FIG. 10 is a computer architecture diagram showing an illustrative computer hardware and software architecture for a computing device that can implement the various technologies presented herein. In particular, the architecture illustrated in FIG. 10 can be utilized to implement a server computer, mobile phone, an e-reader, a smartphone, a desktop computer, an AR/VR device, a tablet computer, a laptop computer, or another type of computing device.

The computer 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A basic input/output system ("BIOS" or "firmware") containing the basic routines that help to transfer information between elements within the computer 1000, such as during startup, can be stored in the ROM 1008. The computer 1000 further includes a mass storage device 1012 for storing an operating the messaging system 1002, application programs, and other types of programs. The mass storage device 1012 can also be configured to store other types of programs and data.

The mass storage device 1012 is connected to the CPU 1002 through a mass storage controller (not shown) connected to the bus 1010. The mass storage device 1012 and its associated computer readable media provide non-volatile storage for the computer 1000. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1000. For purposes of the claims, the phrase "computer storage medium," and variations thereof, does not include waves or signals per se or communication media.

According to various configurations, the computer 1000 can operate in a networked environment using logical connections to remote computers through a network such as the network 1020. The computer 1000 can connect to the network 1020 through a network interface unit 1016 connected to the bus 1010. It should be appreciated that the network interface unit 1016 can also be utilized to connect to other types of networks and remote computer systems. The computer 1000 can also include an input/output controller 1018 for receiving and processing input from a number of other devices, including a keyboard, mouse, touch input, an electronic stylus (not shown in FIG. 10), or a physical sensor such as a video camera. Similarly, the input/output controller 1018 can provide output to a display screen or other type of output device (also not shown in FIG. 10).

It should be appreciated that the software components described herein, when loaded into the CPU 1002 and executed, can transform the CPU 1002 and the overall computer 1000 from a general-purpose computing device into a special-purpose computing device customized to facilitate the functionality presented herein. The CPU 1002 can be constructed from any number of transistors or other discrete circuit elements, which can individually or collectively assume any number of states. More specifically, the CPU 1002 can operate as a finite-state machine, in response to executable instructions contained within the software modules disclosed herein. These computer-executable instructions can transform the CPU 1002 by specifying how the CPU 1002 transitions between states, thereby transforming the transistors or other discrete hardware elements constituting the CPU 1002.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1000 in order to store and execute the software components presented herein. It also should be appreciated that the architecture shown in FIG. 10 for the computer 1000, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1000 might not include all of the components shown in FIG. 10, can include other components that are not explicitly shown in FIG. 10, or can utilize an architecture completely different than that shown in FIG. 10.

Figure 11:
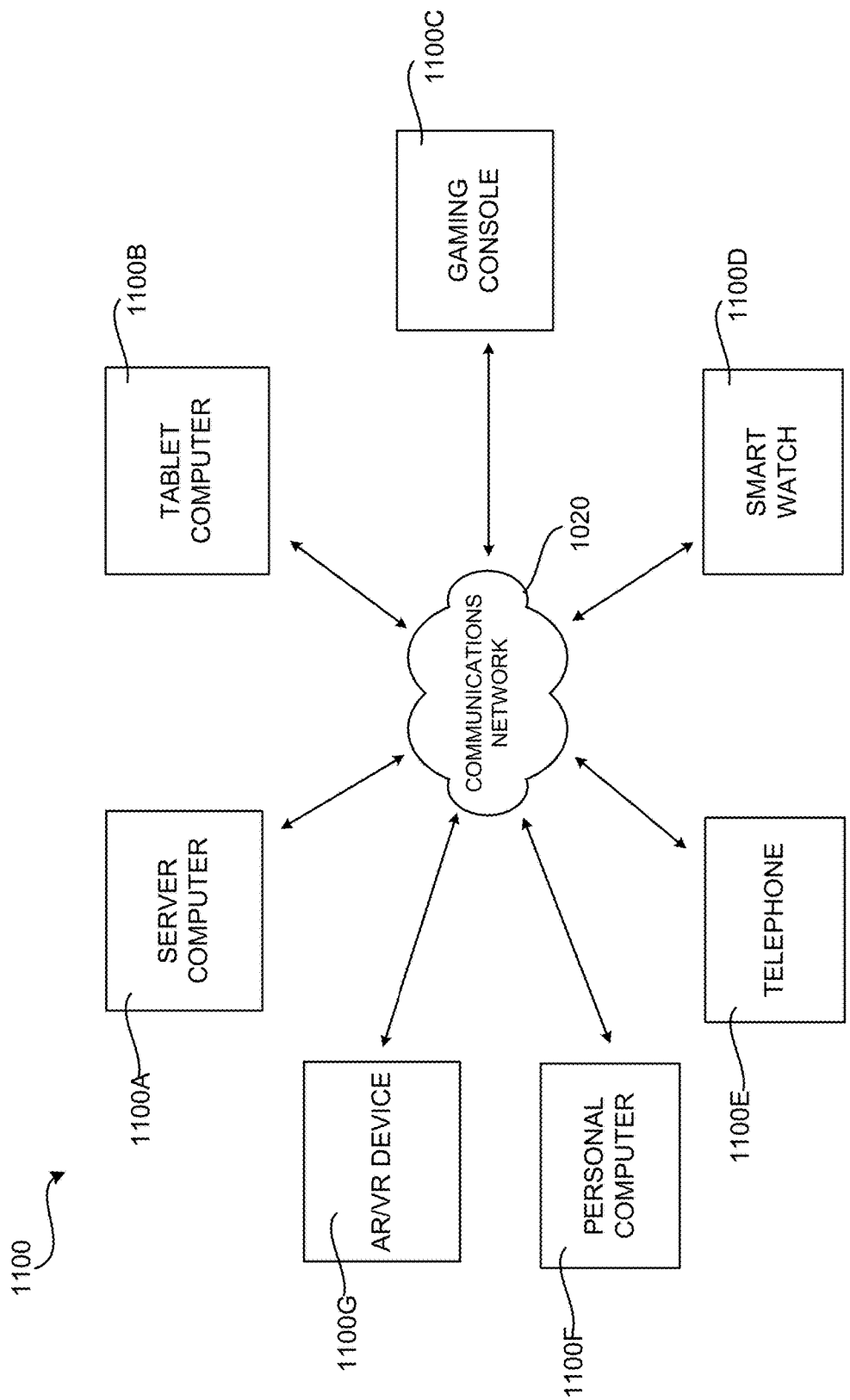
FIG. 11 is a network diagram illustrating a distributed computing environment in which aspects of the disclosed technologies can be implemented.

FIG. 11 is a network diagram illustrating a distributed network computing environment 1100 in which aspects of the disclosed technologies can be implemented, according to various embodiments presented herein. As shown in FIG. 11, one or more server computers 1100A can be interconnected via a communications network 1020 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 1100B, a gaming console 1100C, a smart watch 1100D, a telephone 1100E, such as a smartphone, a personal computer 1100F, and an AR/VR device 1100G.

In a network environment in which the communications network 1020 is the Internet, for example, the server computer 1100A can be a dedicated server computer operable to process and communicate data to and from the client computing devices 1100B-1100G via any of a number of known protocols, such as, hypertext transfer protocol ("HTTP"), file transfer protocol ("FTP"), or simple object access protocol ("SOAP"). Additionally, the networked computing environment 1100 can utilize various data security protocols such as secured socket layer ("SSL") or pretty good privacy ("PGP"). Each of the client computing devices 1100B-1100G can be equipped with an operating system operable to support one or more computing applications or terminal sessions such as a web browser (not shown in FIG. 11), or other graphical user interface (not shown in FIG. 11), or a mobile desktop environment (not shown in FIG. 11) to gain access to the server computer 1100A.

The server computer 1100A can be communicatively coupled to other computing environments (not shown in FIG. 11) and receive data regarding a participating user's interactions/resource network. In an illustrative operation, a user (not shown in FIG. 11) may interact with a computing application running on a client computing device 1100B-1100G to obtain desired data and/or perform other computing applications.

The data and/or computing applications may be stored on the server 1100A, or servers 1100A, and communicated to cooperating users through the client computing devices 1100B-1100G over an exemplary communications network 1020. A participating user (not shown in FIG. 11) may request access to specific data and applications housed in whole or in part on the server computer 10800A. These data may be communicated between the client computing devices 1100B-1100G and the server computer 1100A for processing and storage.

The server computer 1100A can host computing applications, processes and applets for the generation, authentication, encryption, and communication of data and applications, and may cooperate with other server computing environments (not shown in FIG. 11), third party service providers (not shown in FIG. 11), network attached storage ("NAS") and storage area networks ("SAN") to realize application/data transactions.

It should be appreciated that the computing architecture shown in FIG. 10 and the distributed network computing environment shown in FIG. 11 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: selecting one or more most recent messages in a conversation thread; identifying messages of the selected one or more recent messages that specify an action or a query; assigning scores to the messages of the selected one or more recent messages that specify an action or a query; determining if the conversation thread is converged based, at least in part, on the scores; storing data indicating that the conversation thread is converged; and causing a user interface to be presented indicating that the conversation thread is converged.

Clause 2. The computer-implemented method of clause 1, wherein the one or more most recent messages in the conversation thread are selected based upon a number of messages in the conversation thread.

Clause 3. The computer-implemented method of clauses 1 or 2, wherein a first number of the one or more most recent messages in the conversation thread are selected if the number of messages in the conversation thread exceeds a threshold value.

Clause 4. The computer-implemented method of any of clauses 1-3, wherein a second number of the one or more most recent messages in the conversation thread are selected if the number of messages in the conversation thread does not exceed the threshold value.

Clause 5. The computer-implemented method of any of clauses 1-4, further comprising: determining if the conversation thread is non-converged based, at least in part, on the scores; and storing data indicating that the conversation thread is non-converged, wherein the user interface further indicates that the conversation thread is non-converged.

Clause 6. The computer-implemented method of any of clauses 1-5, wherein the conversation is converged when an average of the scores is less than a predefined value.

Clause 7. The computer-implemented method of any of clauses 1-6, wherein the scores are assigned to the messages of the selected one or more recent messages that specify an action or query based upon a position in the conversation thread of the messages of the selected one or more recent messages that specify an action or query.

Clause 8. The computer-implemented method of any of clauses 1-7, wherein higher scores are assigned to more recent messages of the selected one or more recent messages that specify an action or query.

Clause 9. A computing device, comprising: a processor; and a computer-readable storage medium having computer-executable instructions stored thereupon which, when executed by the processor, cause the computing device to: receive a message at a messaging system; responsive to receiving the message, identify a conversation thread associated with the message, selecting messages in the conversation thread that specify an action or a query, assign scores to the messages of the selected messages that specify an action or a query, determine if the conversation thread is converged or non-converged based, at least in part, on the scores, and store data indicating that the conversation thread is converged or non-converged; and cause a user interface to be presented at a client computing device, the UI indicating that the conversation thread is converged or non-converged.

Clause 10. The computing device of clause 9, wherein the messages in the conversation thread comprise recent messages in the conversation thread and are selected based upon a number of messages in the conversation thread.

Clause 11. The computing device of clauses 9 or 10, wherein a first number of the messages in the conversation thread are selected if the number of messages in the conversation thread exceeds a threshold value.

Clause 12. The computing device of any of clauses 9-11, wherein a second number of the messages in the conversation thread are selected if the number of messages in the conversation thread does not exceed the threshold value.

Clause 13. The computing device of any of clauses 9-12, wherein the conversation is non-converged when an average of the scores is greater than or equal to a predefined value.

Clause 14. The computing device of any of clauses 9-13, wherein the scores are assigned to the messages that specify an action or query based upon a position in the conversation thread of the messages that specify an action or query.

Clause 15. The computing device of any of clauses 9-14, wherein higher scores are assigned to more recent messages of the selected messages that specify an action or query.

Clause 16. A computer-readable storage medium having computer-executable instructions stored thereupon which, when executed by a processor, cause a computing device to: identify one or more most recent messages in a conversation thread that specify an action or a query; assign scores to the identified messages that specify an action or a query; determine if the conversation thread is converged based, at least in part, on the scores; and cause a user interface to be presented indicating that the conversation thread is converged.

Clause 17. The computer-readable storage medium of clause 16, wherein identify one or more most recent messages in the conversation thread that specify an action or a query comprises identifying a number of the most recent messages in the conversation thread that specify an action or query, the number of identified messages being selected based upon a total number of messages in the conversation thread.

Clause 18. The computer-readable storage medium of clauses 16 or 17, wherein a first number of the one or more most recent messages in the conversation thread are identified if the total number of messages in the conversation thread exceeds a threshold value.

Clause 19. The computer-readable storage medium of any of clauses 16-18, wherein a second number of the one or more most recent messages in the conversation thread are identified if the total number of messages in the conversation thread does not exceed the threshold value.

Clause 20. The computer-readable storage medium of any of clauses 16-19, having further computer-executable instructions stored thereupon to: determine if the conversation thread is non-converged based, at least in part, on the scores; and cause a user interface to be presented indicating that the conversation thread is non-converged.

Based on the foregoing, it should be appreciated that technologies have been disclosed herein for identifying converged conversation threads. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   selecting one or more messages in a conversation thread;
   identifying a first individual message, of the one or more messages, that specifies at least one of: an action or a query;
   identifying a second individual message, of the one or more messages, that is indicative of at least one of: the action having been performed, or an answer having been provided to the query;
   assigning a first score to the first individual message and a second score to the second individual message;
   determining an average value that is based at least on part on the first score and the second score;
   designating, based on the average value, the conversation thread as being converged to indicate that: the action has been performed, or the query has been answered; and
   causing a user interface to be presented indicating that the conversation thread is designated as converged.

2. The computer-implemented method of claim 1, wherein the one or more messages in the conversation thread are selected based upon a number of messages in the conversation thread.

3. The computer-implemented method of claim 2, wherein a first number of the one or more messages in the conversation thread are selected if the number of messages in the conversation thread exceeds a threshold value.

4. The computer-implemented method of claim 3, wherein a second number of the one or more messages in the conversation thread are selected if the number of messages in the conversation thread does not exceed the threshold value.

5. The computer-implemented method of claim 1, further comprising:
   prior to designating the conversation thread as being converged, determining if the conversation thread is non-converged based, at least in part, on an individual respective score of the first message; and
   storing other data indicating that the conversation thread is non-converged, wherein the user interface further indicates that the conversation thread is non-converged prior to indicating that the conversation thread is converged.

6. The computer-implemented method of claim 1, wherein at least one of the first score or the second score is assigned based upon a position in the conversation thread of the at least one of the first score or the second score.

7. The computer-implemented method of claim 6, wherein higher scores are assigned to more recent messages of the one or more messages.

8. A computer-implemented method, comprising:
   selecting one or more messages in a conversation thread;
   identifying a first individual message, of the one or more messages, that specifies at least one of: an action or a query;
   identifying a second individual message, of the one or more messages, that is indicative of at least one of: the action having been performed, or an answer having been provided to the query;
   assigning a first score to the first individual message and a second score to the second individual message;
   determining an average value that is based at least on part on the first score and the second score;
   designating, based on the average value, the conversation thread as being converged to indicate that: the action has been performed, or the query has been answered; and
   causing a user interface to be presented indicating that the conversation thread is designated as converged, wherein the conversation is designated as being converged based on the average value being less than a predefined value.

9. A computing device, comprising:
   a processor; and
   a computer-readable storage medium having computer-executable instructions stored thereupon which, when executed by the processor, cause the computing device to:
   receive, at a messaging system, a first message that specifies at least one of: an action, or a query;
   identify a conversation thread associated with the first message;
   identify, at the messaging system, a second message that is indicative of at least one of: the action having been performed, or an answer having been provided to the query;

assign at least one score to the first message, that specifies at least one of the action or the query, and at least one score to the second message that is indicative of at least one of the action having been performed or the answer having been provided to the query;

determine if the conversation thread is converged or non-converged based, at least in part, on a comparison of a predefined value to an average of the scores assigned to the first and second messages;

store data indicating whether the conversation thread is converged or non-converged; and cause a user interface to be presented at a client computing device, the user interface indicating whether the conversation thread is converged or non-converged.

10. The computing device of claim 9, wherein the first message and the second message are included within a set of recent messages in the conversation thread that are selected based upon a number of messages in the conversation thread.

11. The computing device of claim 10, wherein a first number of the recent messages in the conversation thread are selected if a total number of messages in the conversation thread exceeds a threshold value.

12. The computing device of claim 11, wherein a second number of the recent messages in the conversation thread are selected if the total number of messages in the conversation thread does not exceed the threshold value.

13. The computing device of claim 9, wherein the assigned scores are assigned to individual messages based upon a position in the conversation thread of the individual messages.

14. The computing device of claim 13, wherein higher scores are assigned to more recent messages of the individual messages.

15. A computing device, comprising:

a processor; and a computer-readable storage medium having computer-executable instructions stored thereupon which, when executed by the processor, cause the computing device to:

receive, at a messaging system, a first message that specifies at least one of: an action, or a query;

identify a conversation thread associated with the first message;

identify, at the messaging system, a second message that is indicative of at least one of: the action having been performed, or an answer having been provided to the query;

assign at least one score to the first message that specifies at least one of the action or the query, and at least one score to the second message that is indicative of at least one of the actions having been performed or the answer having been provided to the query;

determine if the conversation thread is converged or non-converged based, based at least in part, on a comparison of a predefined value to an average of the scores assigned to the first and second messages;

store data indicating whether the conversation thread is converged or non-converged; and cause a user interface to be presented at a client computing device, the user interface indicating whether the conversation thread is converged or non-converged, wherein the conversation is non-converged when the average of the at least one score is greater than or equal to the predefined value.

16. A computer-readable storage medium having computer-executable instructions stored thereupon which, when executed by a processor, cause a computing device to:

identify one or more most recent messages in a conversation thread, wherein the one or more most recent messages include at least:

a first message that specifies an action or a query, and a second message that indicates that the action has been performed or that the query has been answered;

assign scores to the first message that specifies the action or the query, and the second message that indicates that the action has been performed or that the query has been answered;

determine that the conversation thread is converged based, at least in part, on an average value that is based at least in part on the scores that are assigned to the first message that specifies the action or the query, and the second message that indicates that the action has been performed or that the query has been answered; and cause a user interface to be presented indicating that the conversation thread is converged.

17. The computer-readable storage medium of claim 16, wherein the identifying the one or more most recent messages in the conversation thread that specify the action or the query comprises identifying a number of the one or more most recent messages in the conversation thread that specify the action or the query, the number of identified messages being selected based upon a total number of messages in the conversation thread.

18. The computer-readable storage medium of claim 17, wherein a first number of the one or more most recent messages in the conversation thread are identified if the total number of messages in the conversation thread exceeds a threshold value.

19. The computer-readable storage medium of claim 18, wherein a second number of the one or more most recent messages in the conversation thread are identified if the total number of messages in the conversation thread does not exceed the threshold value.

20. The computer-readable storage medium of claim 16, wherein the conversation is determined to be converged based on the average value being less than a predefined value.

* * * * *